(12) United States Patent
DeSalvo et al.

(10) Patent No.: US 8,515,285 B2
(45) Date of Patent: Aug. 20, 2013

(54) RF COMMUNICATIONS DEVICE INCLUDING AN OPTICAL LINK AND RELATED DEVICES AND METHODS

(75) Inventors: Richard DeSalvo, Satellite Beach, FL (US); Charles Middleton, Rockledge, FL (US); Peter S. Scheuter, Melbourne, FL (US); Gus W. Deibner, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 171 days.

(21) Appl. No.: 13/189,727

(22) Filed: Jul. 25, 2011

(65) Prior Publication Data

US 2013/0028610 A1 Jan. 31, 2013

(51) Int. Cl.
*H04B 10/00* (2013.01)

(52) U.S. Cl.
USPC .......................................................... 398/140

(58) Field of Classification Search
USPC .......................................................... 398/140
See application file for complete search history.

(56) References Cited

U.S. PATENT DOCUMENTS

| | | | |
|---|---|---|---|
| 5,710,651 A | 1/1998 | Logan, Jr. ..................... | 359/145 |
| 5,859,611 A | 1/1999 | Lam et al. ..................... | 342/368 |
| 6,115,162 A * | 9/2000 | Graves et al. ................. | 398/116 |
| 6,256,130 B1 | 7/2001 | Bülow .......................... | 359/173 |
| 6,256,137 B1 | 7/2001 | Hironishi ..................... | 359/332 |
| 6,359,716 B1 * | 3/2002 | Taylor .......................... | 398/212 |
| 6,594,070 B2 | 7/2003 | Sugata et al. ................. | 359/326 |
| 6,643,417 B2 | 11/2003 | Strutz et al. ................... | 385/1 |
| 7,369,715 B2 * | 5/2008 | Darcie et al. .................. | 385/3 |
| 7,447,436 B2 * | 11/2008 | Yee et al. ..................... | 398/95 |
| 7,555,217 B2 | 6/2009 | Hillis et al. ................... | 398/115 |
| 7,825,364 B1 | 11/2010 | Hillis et al. ................... | 250/206.2 |
| 2002/0131662 A1 | 9/2002 | Strutz et al. | |
| 2003/0175033 A1 * | 9/2003 | Taga et al. ..................... | 398/152 |
| 2003/0198477 A1 | 10/2003 | Kuri et al. | |
| 2008/0212974 A1 | 9/2008 | Davies et al. ................. | 398/140 |
| 2010/0111540 A1 * | 5/2010 | Caplan et al. ................. | 398/140 |

FOREIGN PATENT DOCUMENTS

WO 2008134436 11/2008

OTHER PUBLICATIONS

Strutz et al., "A 6 to 11 Ghz All-Optical Image Rejection Microwave Downconverter", IEEE, Sep. 2000, pp. 74-77.

* cited by examiner

*Primary Examiner* — Shi K Li
*Assistant Examiner* — Jamil Ahmed
(74) *Attorney, Agent, or Firm* — Allen, Dyer, Doppelt, Milbrath & Gilchrist, P.A.

(57) ABSTRACT

A communications device includes a transmitter device including an optical source configured to generate an optical carrier signal, and a modulator coupled to the optical source and configured to modulate the optical carrier signal with an input signal having a first frequency, an optical waveguide coupled to the transmitter device, and a receiver device coupled to the optical waveguide. The receiver device includes an optical splitter, a first waveguide path coupled to the optical splitter and configured to filter a sideband from the modulated optical carrier signal, a second waveguide path coupled to the optical splitter and configured to generate a selected sideband from selectable sidebands based upon the modulated optical carrier signal, and an optical-to-electrical converter coupled to the first and second waveguide paths and configured to generate an output signal including a replica of the input signal at a second frequency based upon the selected sideband.

21 Claims, 8 Drawing Sheets

RF COMMUNICATIONS DEVICE INCLUDING AN OPTICAL LINK AND RELATED DEVICES AND METHODS

FIELD OF THE INVENTION

The present invention relates to the field of communications, and, more particularly, to radio frequency (RF) communications and related methods.

BACKGROUND OF THE INVENTION

A typical wireless communication system comprises a plurality of wireless communications devices exchanging data with each other. In some wireless communication systems, for example, infrastructure networks, the system may further comprise a wireless base station for managing communications between the wireless communications devices. In other words, each intra-system communication would be exchanged via the wireless base station. In other wireless communication systems, for example, mesh networks and ad hoc wireless networks, the wireless base station may be omitted, i.e. the wireless communications devices may communicate directly with each other.

A typical Extremely High Frequency (EHF), i.e. 30 to 300 GHz, communication system operating at this band may have some drawbacks. For example, transmission of the signals over coaxial cable may incur large attenuation effects. Moreover, in applications where RF devices are used, the size, weight, and power (SWaP) of the components may increase to undesirable levels. Moreover, downstream receiver processing, such as downconverting, and signal addressing may be difficult.

One approach to these drawbacks in EHF communication systems may comprise the use of optical components for processing components. An advantage of such systems may comprise the ability to transmit EHF signals from a remote location without the degradation of the signal incumbent in RF applications.

For example, as disclosed in U.S. Pat. No. 5,710,651 to Logan, Jr., an EHF communication system comprises a remote antenna station, a transmitter/receiver station, and an optical fiber coupling the stations together. These stations comprise photodiodes for converting the transmitted optical signal to an electrical signal, and lasers paired with optical modulators for converting the received EHF signal to an optical signal.

Nevertheless, optical applications such as this may be subject to certain drawbacks. For example, the systems may be subject to chromatic dispersion-induced signal fading. In particular, optical heterodyne approaches may be limited by phase noise of laser sources.

SUMMARY OF THE INVENTION

In view of the foregoing background, it is therefore an object of the present invention to provide a communications device that efficiently operates on RF signals, such as in the EHF band.

This and other objects, features, and advantages in accordance with the present invention are provided by a communications device comprising a transmitter device including an optical source configured to generate an optical carrier signal, and a modulator, for example, a Mach-Zehnder modulator, coupled to the optical source and configured to modulate the optical carrier signal with an input signal having a first frequency. The communication device also includes an optical waveguide coupled to the transmitter device, and a receiver device coupled to the optical waveguide. The receiver device comprises an optical splitter, a first waveguide path coupled to the optical splitter and configured to filter at least one sideband from the modulated optical carrier signal, a second waveguide path coupled to the optical splitter in parallel with the first waveguide path and configured to generate a selected sideband from a plurality of selectable sidebands based upon the modulated optical carrier signal, and an optical-to-electrical converter. The optical-to-electrical converter is coupled to the first and second waveguide paths and is configured to generate an output signal comprising a replica of the input signal at a second frequency based upon the selected sideband. Advantageously, the communications device transmits the received RF signal, such as an EHF signal, with reduced signal degradation.

More specifically the second waveguide path may be configured to filter a carrier frequency band from the modulated optical carrier signal, modulate the carrier frequency band with a reference signal for generating the plurality of selectable sidebands, and filter the selected sideband from the plurality of selectable sidebands. Depending on the embodiment, the first frequency may be less than the second frequency, or the first frequency may be greater than the second frequency.

In some embodiments, the first and second waveguide paths may have equal lengths. Also, for example, the optical-to-electrical converter may comprise first and second optical detectors coupled respectively to the first and second waveguide paths, and a combiner coupled to the first and second optical detectors.

Furthermore, the transmitter device may comprise an amplifier coupled between the optical source and the modulator and operable to amplify the optical carrier signal. The receiver device may comprise a polarization stabilizing module coupled between the optical waveguide and the optical splitter. The first waveguide path may comprise at least one fiber Bragg grating (FBG) operable to filter the modulated optical carrier signal, and the second waveguide path may comprise at least one FBG for filtering the modulated optical carrier signal. Also, the communications device may further comprise an antenna coupled to the modulator and configured to generate the input signal.

Another aspect is directed to an electronic device comprising an optical splitter configured to split a modulated optical carrier signal, the modulated optical carrier signal being associated with an input signal having a first frequency, and a first waveguide path coupled to the optical splitter and configured to filter at least one sideband from the modulated optical carrier signal. The electronic device also includes a second waveguide path coupled to the optical splitter and configured to generate a selected sideband from a plurality of selectable sidebands based upon the modulated optical carrier signal, and an optical-to-electrical converter coupled to the first and second waveguide paths and configured to generate an output signal comprising a replica of the input signal at a second frequency based upon the selected sideband.

Another aspect is directed to a method of operating a communications device comprising modulating with a transmitter device an optical carrier signal with an input signal having a first frequency, and splitting the modulated optical carrier signal in a receiver device coupled to the transmitter device via an optical waveguide. The method also includes using a first waveguide path coupled to the optical splitter to filter at least one sideband from the modulated optical carrier signal, using a second waveguide path coupled to the optical splitter in parallel with the first waveguide path to generate a selected sideband from a plurality of selectable sidebands based upon the modulated optical carrier signal, and generating an output signal comprising a replica of the input signal at a second frequency based upon the selected sideband and an output of the first waveguide path.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
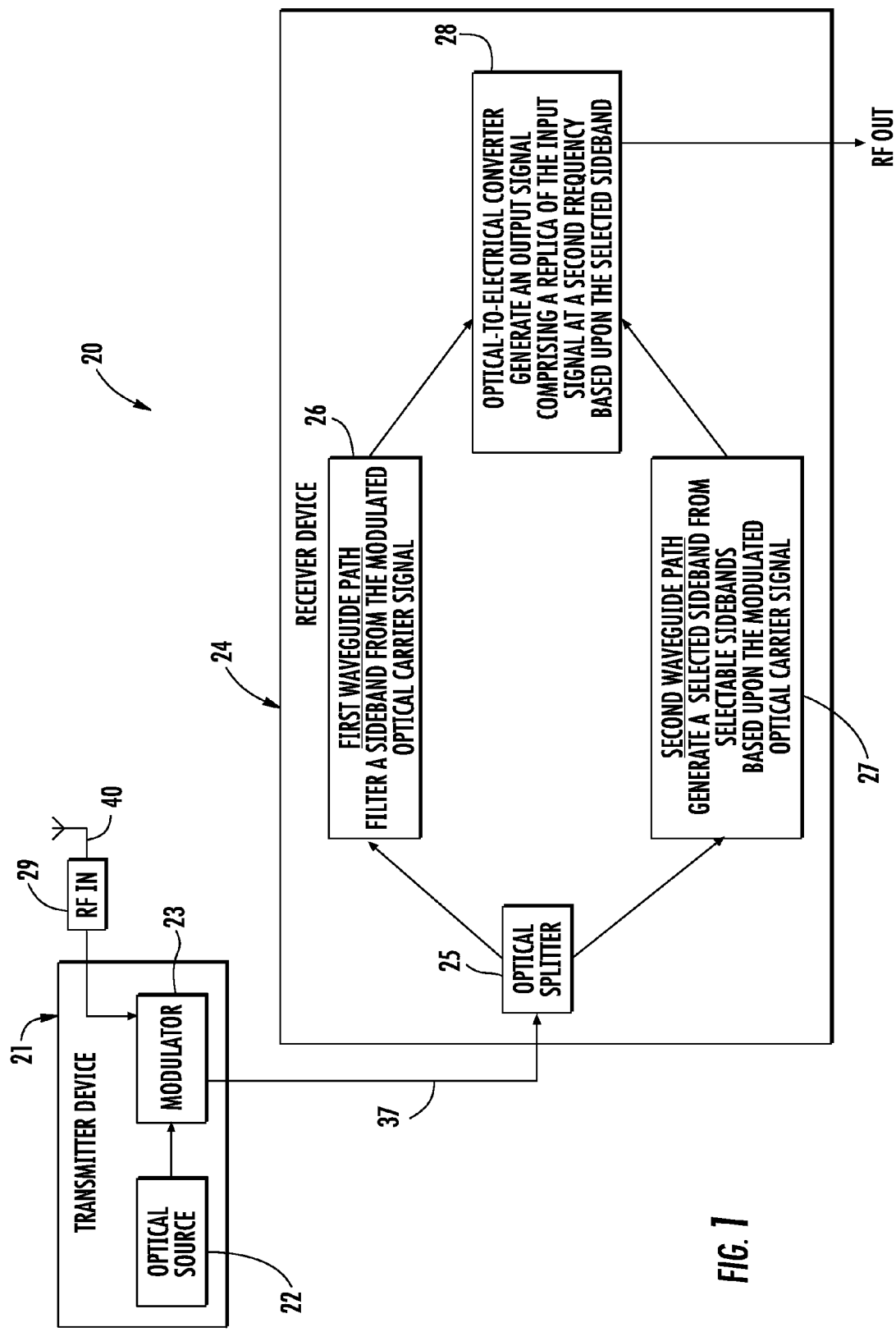
FIG. 1 is a schematic diagram of a communications device, according to the present invention.

Referring initially to FIG. 1, a communications device 20 according to the present invention is now described. For example, the communications device 20 may operate as an optical link. The communications device 20 includes a transmitter device 21 including an optical source 22 configured to generate an optical carrier signal, and a modulator 23, for example, a Mach-Zehnder modulator, coupled to the optical source and configured to modulate the optical carrier signal with an input signal having a first frequency. In the illustrated embodiment, the communications device 20 includes an antenna 40, and an RF input module 29 for generating an input RF signal for processing by the communications device 20. For example, the signal received via the antenna 40 may comprise an EHF signal (millimeter wave signal).

The communication device 20 includes an optical waveguide 37 coupled to the transmitter device 21, and a receiver device 24 coupled to the optical waveguide. As will be appreciated by those skilled in the art, the transmitter device 21 may be remote to the receiver device 24, i.e. the optical waveguide 37 may be several kilometers long, for example. The receiver device 24 includes an optical splitter 25, a first waveguide path 26 coupled to the optical splitter and configured to filter at least one sideband from the modulated optical carrier signal, a second waveguide path 27 coupled to the optical splitter and configured to generate a selected sideband from a plurality of selectable sidebands based upon the modulated optical carrier signal, and an optical-to-electrical converter 28 coupled to the first and second waveguide paths and configured to generate an output signal comprising a replica of the input signal at a second frequency based upon the selected sideband.

Figure 2:
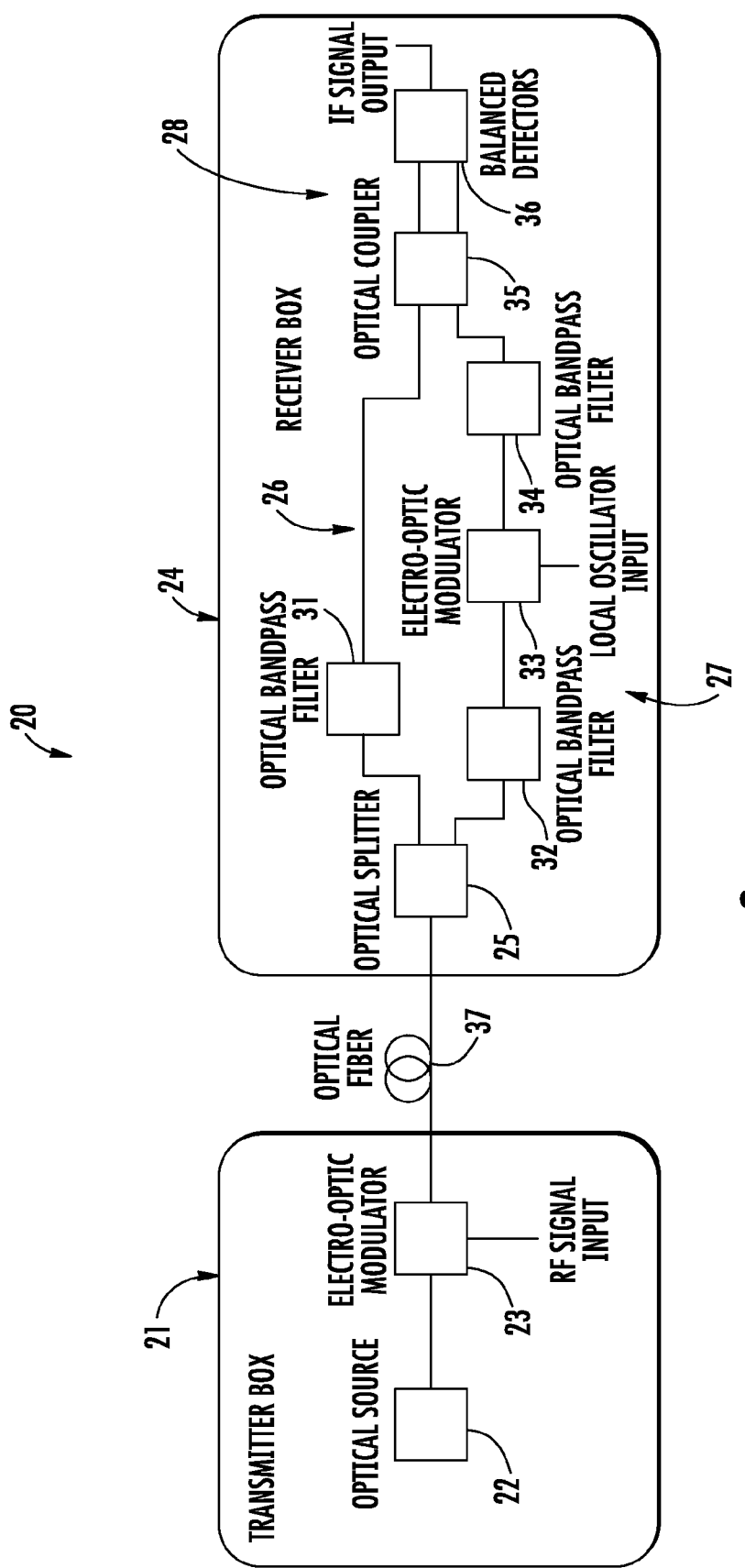
FIG. 2 is a detailed schematic diagram of a communications device, according to the present invention.

Referring now additionally to FIG. 2, the first waveguide path 26 includes a band-pass filter 31 configured to filter at least one sideband from the modulated optical carrier signal, i.e. at least one sideband resulting from the spectral components of the RF input signal. The second waveguide path 27 includes a first band-pass filter 32 configured to filter a carrier frequency band from the modulated optical carrier signal, i.e. the spectral components from the RF input signal are removed. The second waveguide path 27 includes an electro-optic modulator 33, and a local oscillator (not shown) cooperating therewith. The electro-optic modulator 33 is configured to modulate the carrier frequency band signal with a reference signal, in this embodiment, an oscillating signal, for generating the plurality of selectable sidebands.

The second waveguide path 27 includes a second band-pass filter 34 configured to filter the selected sideband from the plurality of selectable sidebands. The optical-to-electrical converter 28 includes an optical coupler 35, and a pair of balanced detectors 36 coupled thereto for combining the selected sideband signal from the second waveguide path 27 with the RF input signal sideband from the first waveguide path 26. Based upon the combination of these signals in the optical-to-electrical converter 28, the frequency of the RF input signal is downconverted into an intermediate frequency (IF) signal, as will be appreciated by those skilled in the art. Advantageously, the second band-pass filter 34 may be configured to switch between the selectable sidebands to change the downconvert rate and also enable upconverting capabilities. In other words, depending on the configuration of the second band-pass filter 34, the first frequency may be less than the second frequency, or the first frequency may be greater than the second frequency.

In some embodiments, the first and second waveguide paths 26-27 may have equal lengths. This may avoid undesired phase delay that may be introduced if the path lengths were dissimilar. Nevertheless, in other embodiments, phase delay compensation may be included in the first and second waveguide paths 26-27 if differing path lengths are used in an application.

Figure 3:
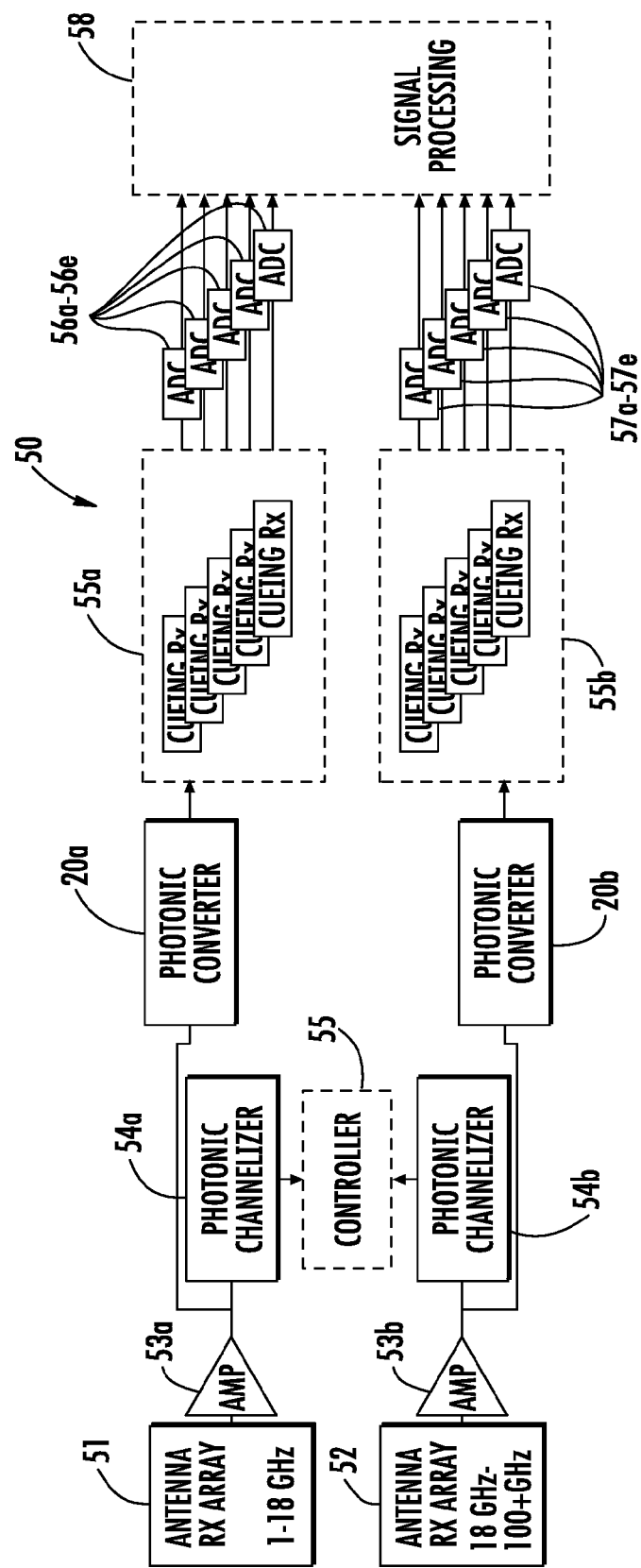
FIG. 3 is a schematic diagram of a communication system, according to the present invention.
Figure 4:
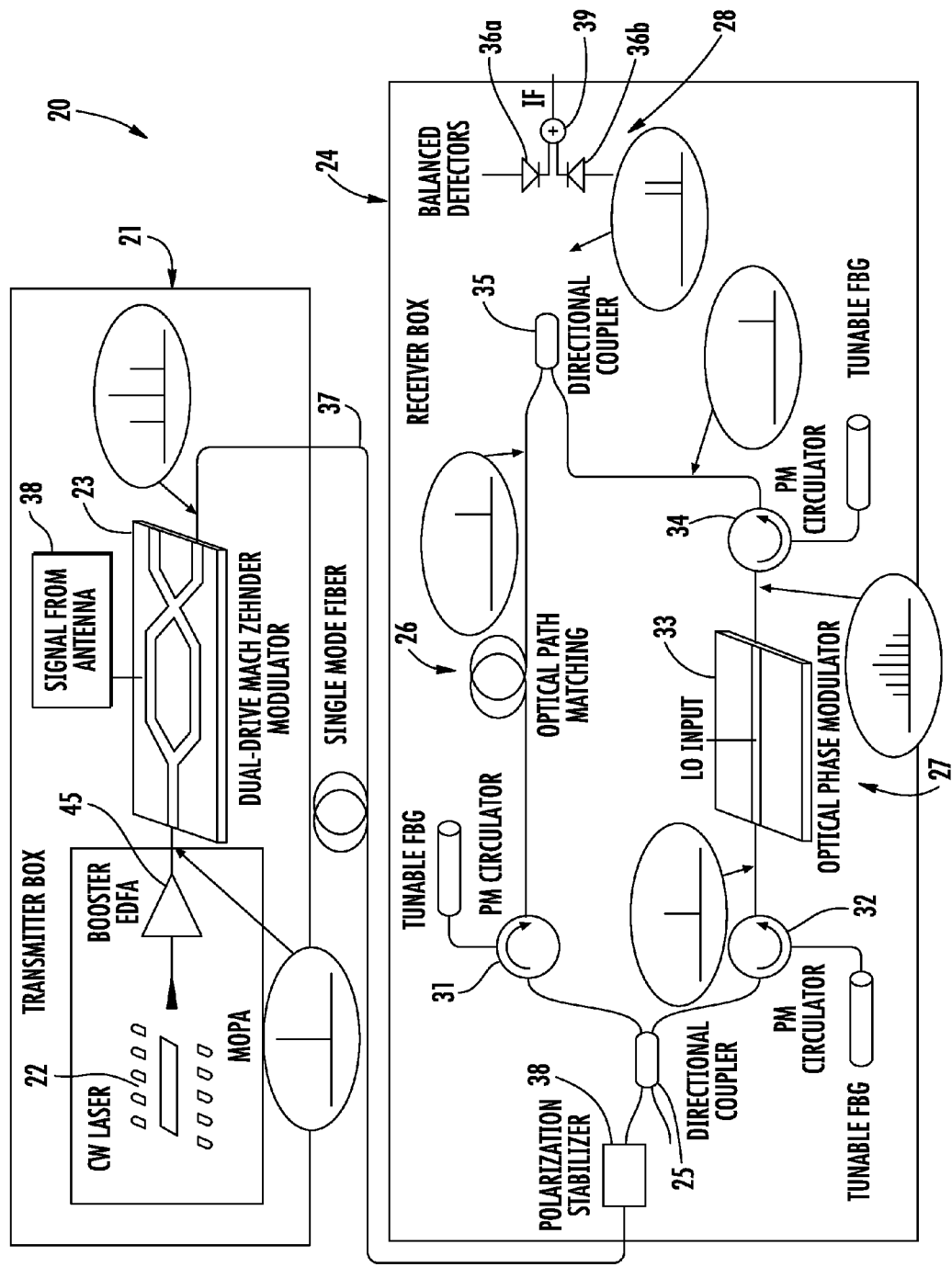
FIG. 4 is detailed schematic diagram of a communications device from FIG. 3.

Referring to FIGS. 3-4, an exemplary implementation of a communication system 50 according to the present invention is now described. The communication system 50 includes a pair of antenna arrays 51-52, a pair of amplifiers 53a-53b coupled respectively thereto, a pair of photonic channelizers 54a-54b coupled respectively thereto, and a controller module 55 coupled to the photonic channelizers. The communication system 50 includes a pair of photonic converters (down-converting remoting link) 20a-20b, as described herein, coupled respectively to the photonic channelizers 54a-54b, a pair of receiver modules 55a-55b coupled respectively thereto, first and second pluralities of analog-to-digital converters (ADCs) 56a-56e, 57a-57e coupled respectively thereto, and a digital signal processing module 58 receiving the digital outputs of the first and second pluralities of ADCS.

The down-converting remoting link 20 includes a transmitter device 21 and a receiver device 24. In the transmitter device 21, an amplified continuous wave (CW) laser 32 tone is modulated using a dual-drive Mach-Zehnder intensity modulator 23 operating at the quadrature bias point. This modulation produces two RF sidebands on either side of the optical carrier. The optical output of the modulator travels to the receiver device 24 via a length of single-mode optical fiber 37. The amplified CW laser tone already captures the booster EDFA. Also, this only amplifies the carrier, as no sidebands have been generated by the modulator before the light enters the dual-drive Mach-Zehnder intensity modulator 23.

The receiver device 24 may rely on heterodyne down-conversion for frequency translation, hence it may require the polarization of the optical fields of the transmitted signal and local oscillator to be parallel for efficient optical mixing. Typically, this requirement may be addressed by using polarization maintaining (PM) fibers. In typical applications using PM fibers, vibration in ground, avionic, and shipboard applications may limit effectiveness due to polarization cross-coupling. To mitigate this insertion risk, the down-converting remoting link 20 may rely on single-mode fiber and an active polarization stabilizer 38 in the receiver device 24. The polarization stabilizer 38 aligns the polarization of the optical signal to the slow axis of polarization-maintaining optical fiber at the input of the receiver device 24. The signal is then routed along two different paths 26-27 by a directional coupler 25. The first path 26 includes an optical band-pass filter 31, in this illustrative example, an optical circulator and a thermally-tunable FBG. This filter 31 is used to select one of the two sidebands adjacent to the optical carrier.

The second path 27 includes an optical band-pass filter 32 (in this example, an FBG) to select the optical carrier and reject the two sidebands. Following the filter 32, an optical phase modulator 33 is used to introduce the local oscillator signal. This produces a series of optical sidebands with frequency spacing set by the local oscillator input signal. An additional filter 34 (in this example, an FBG) is used to select one of the local oscillator sidebands. These two separate paths meet at a final directional coupler 35, where the signal sideband combines with the local oscillator sideband to generate the IF signal (The sidebands combine in the directional coupler, but they don't beat to generate the IF until the detector).

Also, in this embodiment, the optical-to-electrical converter 28 includes first and second optical detectors 36a-36b coupled respectively to the first and second waveguide paths 26-27 via the coupler 35, and a combiner 39 coupled to the first and second optical detectors.

Advantageously, the harmonics of the local oscillator can also be selected by the additional tunable filter 34, allowing down-conversion of higher RF frequencies using a relatively low-frequency local oscillator (LO) source. For example, if the RF signal from the antenna is at 20 GHz and a 2 GHz IF is desired, comparable performance can be achieved by using an LO signal of 18 GHz with +10 dBm input power, 9 GHz with +18 dBm input power (filter selects 2nd harmonic of 9 GHz signal), or 6 GHz with +22 dBm (filter selects 3rd harmonic of 6 GHz signal), as shown in Table 1 below.

As will be appreciated by those skilled in the art, the technical risks may be assumed to be on the low to moderate scale from both the implementation and performance perspectives. The opto-electronic components identified in the down-converting remoting link 20 are at a high technology readiness level, i.e. >TRL-5 and above, and may be used in demanding commercial and space applications.

Link performance may be driven by many factors, including the half-wave voltage of the intensity and phase modulators 23, 33, the optical power at the input of the intensity modulator, the insertion loss of the modulators and filters, and the LO signal input power level. The gain of the intrinsic link is given by the following formula.

$$G = 2\left(\frac{\pi R P_{opt} G_{EDFA} \eta_1}{32 V_{\pi 1}}\right)^2 \eta_2 \eta_3 J_n^2\left(\frac{\pi}{V_{\pi 2}} \sqrt{2R_{m2} P_{LO}}\right) R_{m1} R_{pd}$$

Here R is the detector responsivity (A/W); $P_{opt}$ is the optical power produced by the CW laser 27; $G_{EDFA}$ is the gain of the booster EDFA between the CW laser and the intensity modulator 23; $\square_1$ represents the combined insertion loss of the intensity modulator, the optical fiber 37 between the transmitter and receiver devices, the polarization stabilizer 38, and the directional couplers 25, 35; $V_{\pi 1}$ and $V_{\pi 2}$ are the half-wave voltages of the intensity modulator and the phase modulator 33, respectively; $\square_2$ represents the combined insertion loss of the upper path 26 in the receiver device 24, including the optical circulator and FBG filter 31, and additional fiber used for optical path matching; $\square_3$ represents the combined insertion loss of the lower path 27 in the receiver device, including the two optical circulators, two FBGs 32, 34, and the optical phase modulator; $J_\square$ is the Bessel function of the first kind, where the subscript n corresponds to the sideband selected by the filter as the LO sideband for down-conversion (e.g., n=1 for LO input signal, n=2 for 2nd harmonic of LO input signal, etc.); $R_{m1}$ and $R_{m2}$ are the impedances of the intensity modulator and phase modulator; $P_{LO}$ is the power of the local oscillator signal input to the phase modulator; and $R_{pd}$ is the impedance of the photodetector 36a-36b. Third-order intercept point (OIP3) is given by the following formula.

$$OIP3 = \left(\frac{R P_{opt} G_{EDFA} \eta_1}{4}\right)^2 \frac{\eta_2 \eta_3}{2} J_n^2\left(\frac{\pi}{V_{\pi 2}} \sqrt{2R_{m2} P_{LO}}\right) R_{pd}$$

Because the intensity modulator 23 is operated at the quadrature bias point, second-order distortion terms in the modulator are suppressed. Balanced detection may provide additional suppression as well as common-mode noise rejection, which may substantially reduce the contributions of relative intensity noise (RIN) from the laser and amplified spontaneous emission (ASE)-beat noise from the optical amplifier. Thus, the output of the link is dominated by shot noise from the detector 36a-36b. The main contributor to shot noise is the local oscillator sideband. The DC photocurrent on each detector 36a-36b is given by the following formula.

$$I_{DC} = \frac{R P_{opt} G_{EDFA} \eta_1 \eta_3}{32} J_n^2\left(\frac{\pi}{V_{\pi 2}} \sqrt{2R_{m2} P_{LO}}\right).$$

Performance projections based on measured component values at 20 GHz are given in Table 1, shown herein. The LO drive power for a given sideband harmonic is also given. These performance values may require an input optical power level of 2 W, modulator half-wave voltages of 3 V, detector responsivity of 0.8 A/W, and low insertion losses ($\square_1$=3 dB, $\square_2$=6 dB, $\square_3$=15 dB).

TABLE 1

| LO = | 18 GHz | 9 GHz | 6 GHz |
| --- | --- | --- | --- |
| LO Power (dBm) | +10 | +18 | +22 |
| Gain (dB) | −22.5 | −22.5 | −23 |
| Noise FIGURE (dB) | 26.1 | 26.1 | 26.3 |
| SFDR (dB Hz 2/3) | 115 | 115 | 114.9 |

Link performance, particularly link gain and noise, can be improved by including an RF low-noise amplifier 45 at the input of the intensity modulator 23. This comes at the possible expense of Spurious-Free Dynamic Range (SFDR), which can be reduced if the OIP3 of the RF amplifier is not sufficiently high. Table 2 shows the impact of an RF amplifier on overall link performance, using three commercially-available amplifiers with different levels of gain and OIP3.

TABLE 2

Insertion Of Coherent RF Photonics In Compelling System Applications

|  | Intrinsic | Hittite HMC797 | Hittite HMC465 | Hittite HMC490 |
|---|---|---|---|---|
| Bandwidth (GHz) | 0-40 | 0-22 | 0-20 | 12-17 |
| Link Gain (dB) | −22.5 | −8 | −5.5 | 4.5 |
| Link Noise FIGURE (dB) | 26.1 | 12.1 | 10 | 3.8 |
| SFDR (dB Hz 2/3) | 115 | 114.5 | 113.7 | 111.6 |

The characteristics of the down-converting remoting link 20 make for intriguing insertion opportunities adding new capabilities that can be applied to a wide variety of architectures. The key characteristics may include improved size, weight and power consumption (SWaP), remoting of wideband/high frequency signals over long distances, handling and processing of RF-microwave, and millimeter wave signals, and wideband channelizers. A SWaP analysis comparing the down-converting remoting link 20 to typical electronics-based 2-18 GHz frequency converter module is described herein. The analysis assumed a direct drop-in replacement therefore the footprints of the two were made equal. If one assumes a "clean sheet of paper" design, size reductions of 25% can be realized directly from the benefits of inherent size, isolation, and flexibility of optical fiber cables as compared to RF cabling.

The all-optical approach also may result in over-all improvements in the manufacturability of the converter through realizing multi-channel, high "circuit" densities and the elimination of performance tuning due to RF component variations.

Remoting of wideband and high frequency signals over optical fibers using typical Intensity Modulated Direct Detection (IMDD) results in fading of the RF signals due to the chromatic dispersion arising from the frequency-dependent refractive index of optical fibers. This frequency dependence results in a differential phase delay between the double sidebands.

Figure 5:
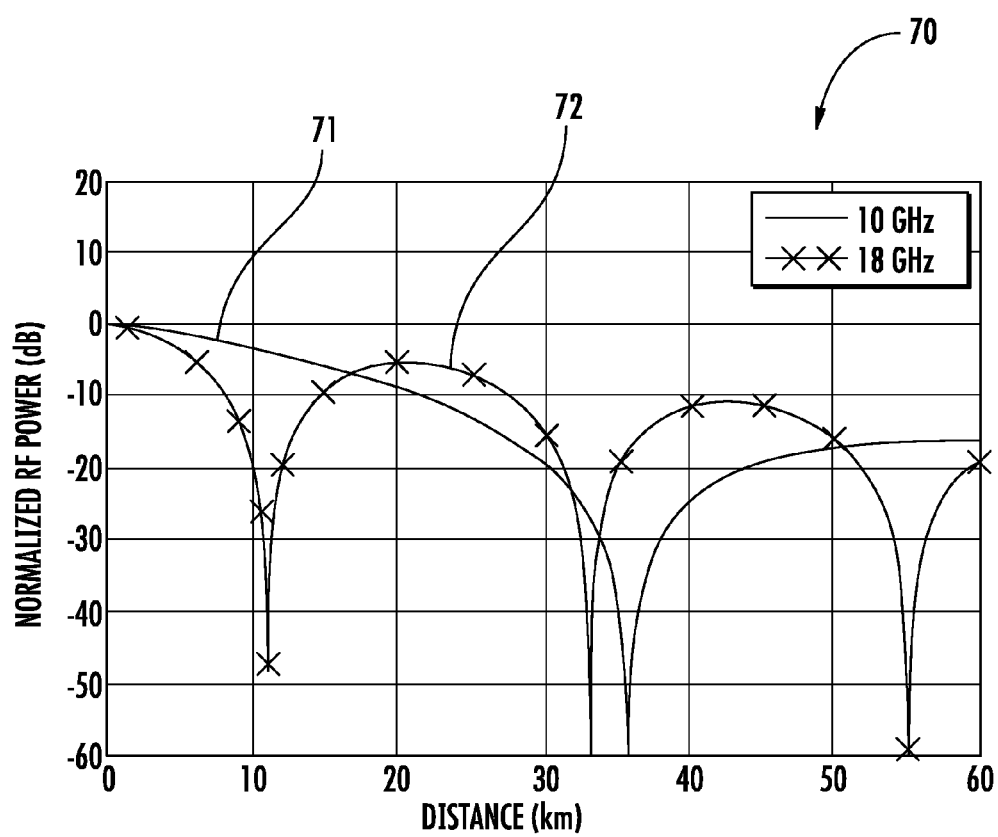
FIGS. 5-6 are diagrams illustrating loss over distance and RF input frequency, respectively, in the communications device of FIG. 4.
Figure 6:
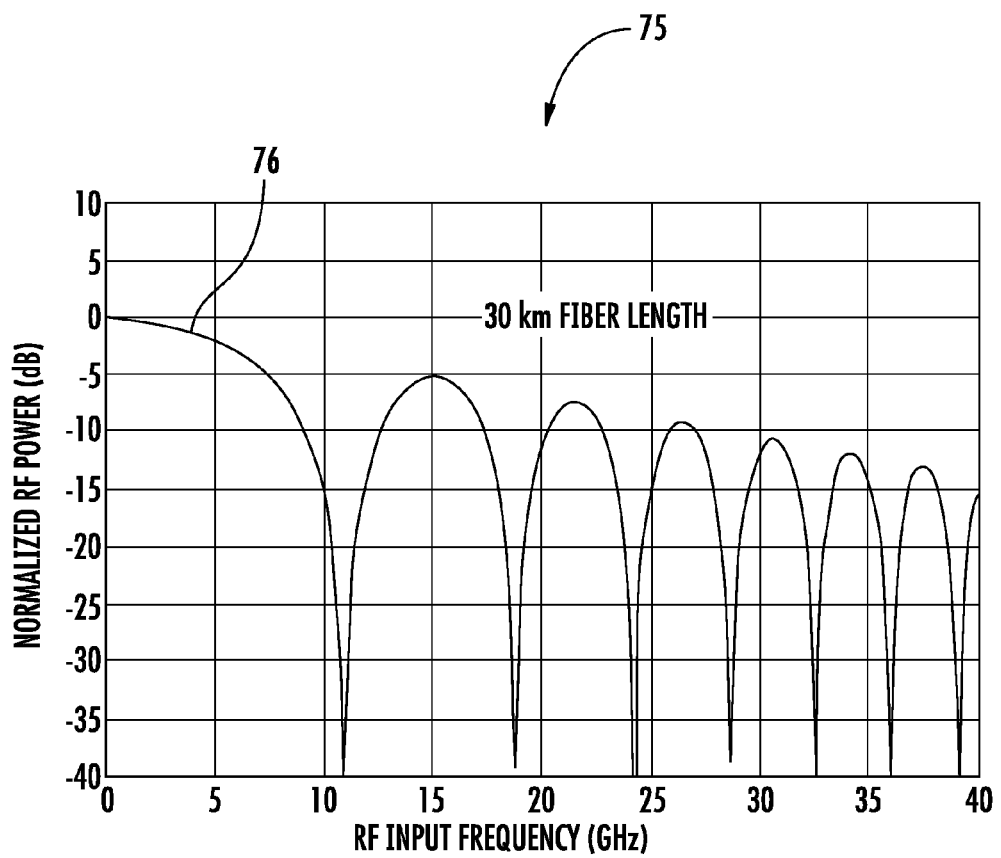
Figure 7:
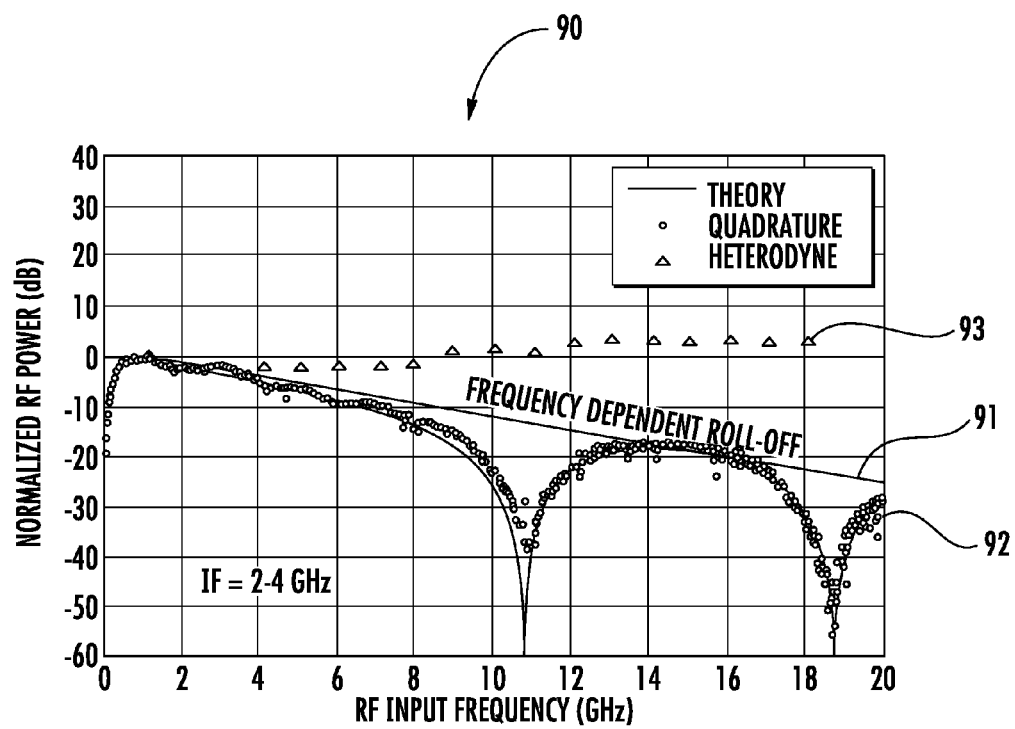
FIG. 7 is a diagram illustrating loss over RF input frequency in the communications device of FIG. 4.

Referring now additionally to FIGS. 5-7, the fading effects in the down-converting remoting link 20 are shown in diagrams 70, 75. The curves 71, 72 illustrate the loss at 10 GHz and 18 GHz, respectively. The curve 76 illustrates the loss over 30 km of optical fiber.

The IMDD measurements of received RF power show the quadratic-variation in the normalized optical power fade for a 30 km remoting link. The down-converting remoting link 20 does not demonstrate the fading characteristics. Moreover, since the wideband signals are down-converted to a 2-4 GHz IF, the recovered signals are constant in power and do not experience the frequency-dependent roll-off commonly experienced in the typical IMDD links (FIG. 7: curves 91-93). In the diagram 90, it is assumed that the optical waveguide 37 comprises 30 km of Corning SMF-28 optical fiber, as available from Corning, Inc. of Corning, N.Y. (at λ=1556 nm, the cable having a dispersion of 17 ps/nm/km).

Figure 8:
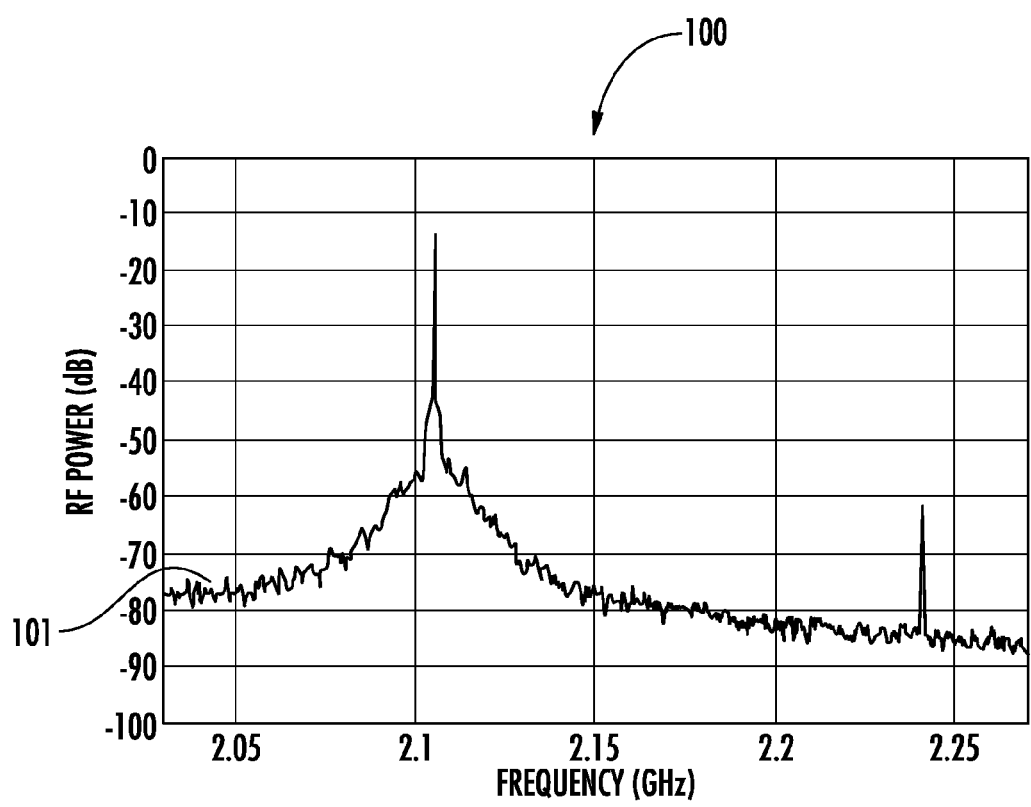
FIG. 8 is a diagram of the downconverted signal in the communications device of FIG. 4.

Referring now to FIG. 8, a diagram 100 and the curve 101 therein show that the heterodyne demodulation experiments demonstrate an advantageous way to down-convert microwave and millimeter wave frequencies to a convenient IF for subsequent processing. Depicted in FIG. 8 is the RF spectrum of a 1 GHz IF signal down-converted from a 20 GHz RF signal. This approach may allow for a common, highly optimized receive platform capable of demodulating high frequency signals where the instantaneous bandwidth and high frequency content will only be limited by the electro-optic modulator's RF-to-Optical conversion efficiency.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications device comprising:
   a transmitter device comprising an optical source configured to generate an optical carrier signal, and a modulator coupled to said optical source and configured to modulate the optical carrier signal with an input signal having a first frequency;
   an optical waveguide coupled to said transmitter device; and
   a receiver device coupled to said optical waveguide and comprising
      an optical splitter,
      a first waveguide path coupled to said optical splitter and configured to filter at least one sideband from the modulated optical carrier signal,
      a second waveguide path coupled to said optical splitter in parallel with said first waveguide path and configured to
         filter a carrier frequency band from the modulated optical carrier signal,
         phase modulate the carrier frequency band with a reference signal for generating a plurality of selectable sidebands, and
         filter a selected sideband from the plurality of selectable sidebands to generate the selected sideband from the plurality of selectable sidebands based upon the modulated optical carrier signal, and
      an optical-to-electrical converter coupled to said first and second waveguide paths and configured to generate an output signal comprising a replica of the input signal at a second frequency based upon the selected sideband.

2. The communications device of claim 1 wherein the first frequency is less than the second frequency.

3. The communications device of claim 1 wherein the first frequency is greater than the second frequency.

4. The communications device of claim 1 wherein said first and second waveguide paths have equal lengths.

5. The communications device of claim 1 wherein said optical-to-electrical converter comprises:
   first and second optical detectors coupled respectively to said first and second waveguide paths; and
   a combiner coupled to said first and second optical detectors.

6. The communications device of claim 1 wherein said transmitter device comprises an amplifier coupled between said optical source and said modulator and operable to amplify the optical carrier signal.

7. The communications device of claim 1 wherein said receiver device comprises a polarization stabilizing module coupled between said optical waveguide and said optical splitter.

8. The communications device of claim 1 wherein said first waveguide path comprises at least one fiber Bragg grating operable to filter the modulated optical carrier signal; and wherein said second waveguide path comprises at least one fiber Bragg grating operable to filter the modulated optical carrier signal.

9. The communications device of claim 1 further comprising an antenna coupled to said modulator and operable to generate the input signal.

10. The communications device of claim 1 wherein said modulator comprises a Mach-Zehnder modulator.

11. An electronic device comprising:
an optical splitter configured to split a modulated optical carrier signal, the modulated optical carrier signal being associated with an input signal having a first frequency;
a first waveguide path coupled to said optical splitter and configured to filter at least one sideband from the modulated optical carrier signal;
a second waveguide path coupled to said optical splitter in parallel with said first waveguide path and configured to
filter a carrier frequency band from the modulated optical carrier signal,
phase modulate the carrier frequency band with a reference signal for generating a plurality of selectable sidebands, and
filter a selected sideband from the plurality of selectable sidebands to generate the selected sideband from the plurality of selectable sidebands based upon the modulated optical carrier signal; and
an optical-to-electrical converter coupled to said first and second waveguide paths and operable to generate an output signal comprising a replica of the input signal at a second frequency based upon the selected sideband.

12. The electronic device of claim 11 wherein the first frequency is less than the second frequency.

13. The electronic device of claim 11 wherein the first frequency is greater than the second frequency.

14. The electronic device of claim 11 wherein said first and second waveguide paths have equal lengths.

15. The electronic device of claim 11 wherein said optical-to-electrical converter comprises:
first and second optical detectors coupled respectively to said first and second waveguide paths; and
a combiner coupled to said first and second optical detectors.

16. A method of operating a communications device comprising:
modulating with a transmitter device an optical carrier signal with an input signal having a first frequency;
splitting the modulated optical carrier signal in a receiver device coupled to the transmitter device via an optical waveguide;
using a first waveguide path to filter at least one sideband from the modulated optical carrier signal;
using a second waveguide path in parallel with the first waveguide path to
filter a carrier frequency band from the modulated optical carrier signal,
phase modulate the carrier frequency band with a reference signal for generating a plurality of selectable sidebands, and
filter a selected sideband from the plurality of selectable sidebands to generate the selected sideband from the plurality of selectable sidebands based upon the modulated optical carrier signal; and
generating an output signal comprising a replica of the input signal at a second frequency based upon the selected sideband and an output of the first waveguide path.

17. The method of claim 16 wherein the first frequency is less than the second frequency.

18. The method of claim 16 wherein the first frequency is greater than the second frequency.

19. The method of claim 16 wherein the first and second waveguide paths have equal lengths.

20. The method of claim 16 further comprising using first and second optical detectors coupled respectively to the first and second waveguide paths and a combiner coupled to the first and second optical detectors to generate the output signal.

21. The method of claim 16 further comprising using an amplifier in the transmitter device to amplify the optical carrier signal.

* * * * *